United States Patent
Xu et al.

(10) Patent No.: US 8,054,722 B2
(45) Date of Patent: Nov. 8, 2011

(54) DISK OPERATION PROTECTION METHOD AND DISK CONTROLLER

(75) Inventors: Mingjun Xu, Shenzhen (CN); Shuai Xiao, Shenzhen (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 344 days.

(21) Appl. No.: 12/417,391

(22) Filed: Apr. 2, 2009

(65) Prior Publication Data

US 2009/0285068 A1 Nov. 19, 2009

(30) Foreign Application Priority Data

May 19, 2008 (CN) .......................... 2008 1 0098141

(51) Int. Cl.
*G11B 5/09* (2006.01)
(52) U.S. Cl. .................. 369/53.21; 369/47.15; 369/59.1
(58) Field of Classification Search .................. None
See application file for complete search history.

(56) References Cited

U.S. PATENT DOCUMENTS 7,664,000 B2 * 2/2010 Horie ........................... 369/100

FOREIGN PATENT DOCUMENTS

CN 1176427 A 3/1998

OTHER PUBLICATIONS

First Office Action (with partial translation) issued in corresponding Chinese Application No. 2008100981416, mailed Apr. 13, 2010.

* cited by examiner

*Primary Examiner* — Muhammad N Edun
(74) *Attorney, Agent, or Firm* — Brinks Hofer Gilson & Lione

(57) ABSTRACT

A disk operation protection method and a disk controller are disclosed herein. The method includes: receiving a request for a disk operation; obtaining, by a disk controller, operation control parameters corresponding to the current disk area to be operated, and determining whether to allow operation of the current disk area according to the operation control parameters; if determining that the current disk area is allowed to be operated according to the operation control parameters, performing the disk operation. By implementing the embodiments of the present disclosure, the operation of the data stored in a disk is protected, illegal disk operations such as maliciously intended modification are prevented, the disk is protected in the process of generating data, and the defects of the disk protection mechanism in the prior art are overcome.

13 Claims, 6 Drawing Sheets

DISK OPERATION PROTECTION METHOD AND DISK CONTROLLER

CROSS-REFERENCE TO RELATED APPLICATIONS

The present application claims priority to Chinese Patent Application Serial No. 200810098141.6 filed on May 19, 2008. The contents of the above identified application are incorporated herein by reference in their entirety.

FIELD OF THE INVENTION

The present disclosure relates to the field of electronic technologies, and in particular, to a disk operation protection technology.

BACKGROUND

In electronic devices, it is usually necessary to store data into a disk. For example, video signals obtained by a video monitoring device need to be recorded into a disk; stock market data, weather report data, and news logs need to be recorded. Such data needs to be recorded authentically to reflect the actual conditions. That is to say, the stored records allow no modification. Therefore, a proper protection mechanism is required for the data of stored records.

In the foregoing process of storing generated data, in order to help a data owner perform real-time protection for the generated data, the following solutions are applicable:

The first solution is to save the data recorded in a disk through an upper-layer application software or operating system, for example, through a file rights management mechanism of a Unix or Windows operating system, where the operations of the files are controlled through different rights.

The corresponding security mechanism of the first solution maybe tends to be bypassed and leads to protection failure. For example, the attackers may obtain the rights of a super user by illegal means, and manipulate the system loopholes or modify the system time to dodge the security mechanism.

The other solution is to protect the whole Logic Unit Number (LUN) on the storage device by setting rights for the LUN, and restrict the data generators and users from accessing the data stored in the disk.

In the foregoing second solution, the saving operation is maybe not available in the process of generating the data.

SUMMARY

A disk operation protection method and a disk controller are provided in embodiments of the present disclosure in order to protect data recorded in a disk against illegal operations, as described below:

The method for disk operation protection includes: obtaining, by a disk controller, an operation control parameter corresponding to a current disk area to be operated after receiving a request for a disk operation; determining whether the current disk area is allowed to be operated according to the operation control parameter; and performing the disk operation if it is determined that the current disk area is allowed to be operated according to the operation control parameter.

The disk controller includes: a parameter obtaining unit, adapted to obtain an operation control parameter corresponding to the current disk area to be operated after receiving a request for a disk operation, where the operation control parameter is used to indicate whether the current disk area is allowed to be operated; and a disk operation control processing unit, adapted to determine whether the current disk area is allowed to be operated according to the operation control parameter obtained by the parameter obtaining unit, and perform a disk operation if it is determined that the current disk area is allowed to be operated.

The embodiments provides proper operation protection for the data stored in a disk to prevent illegal disk operations such as maliciously intended modification, and performs disk protection in the process of generating data to overcome the defects of the disk protection mechanism in the prior art.

DETAILED DESCRIPTION

The disk operation protection solution provided in an embodiment of the present disclosure controls the operations such as reading data from a disk and writing data to a disk on the disk controller layer. For example, a disk controller obtains operation control parameters corresponding to the current disk area to be operated, where the operation control parameters indicate whether to allow operation of the current disk area; and performs the disk operation if determining that the current disk area is allowed to be operated according to the operation control parameters. Alternatively, after receiving a disk operation request, a disk controller obtains operation control parameters corresponding to the current disk area to be operated The foregoing embodiment is no longer based on application software or operating systems for implementing disk operation protection, such as reading and writing protection. The embodiment separates the rights among the data generator, the data user, and the data owner. The embodiment enables the data owner to protect the generated data in real time.

Figure 1:
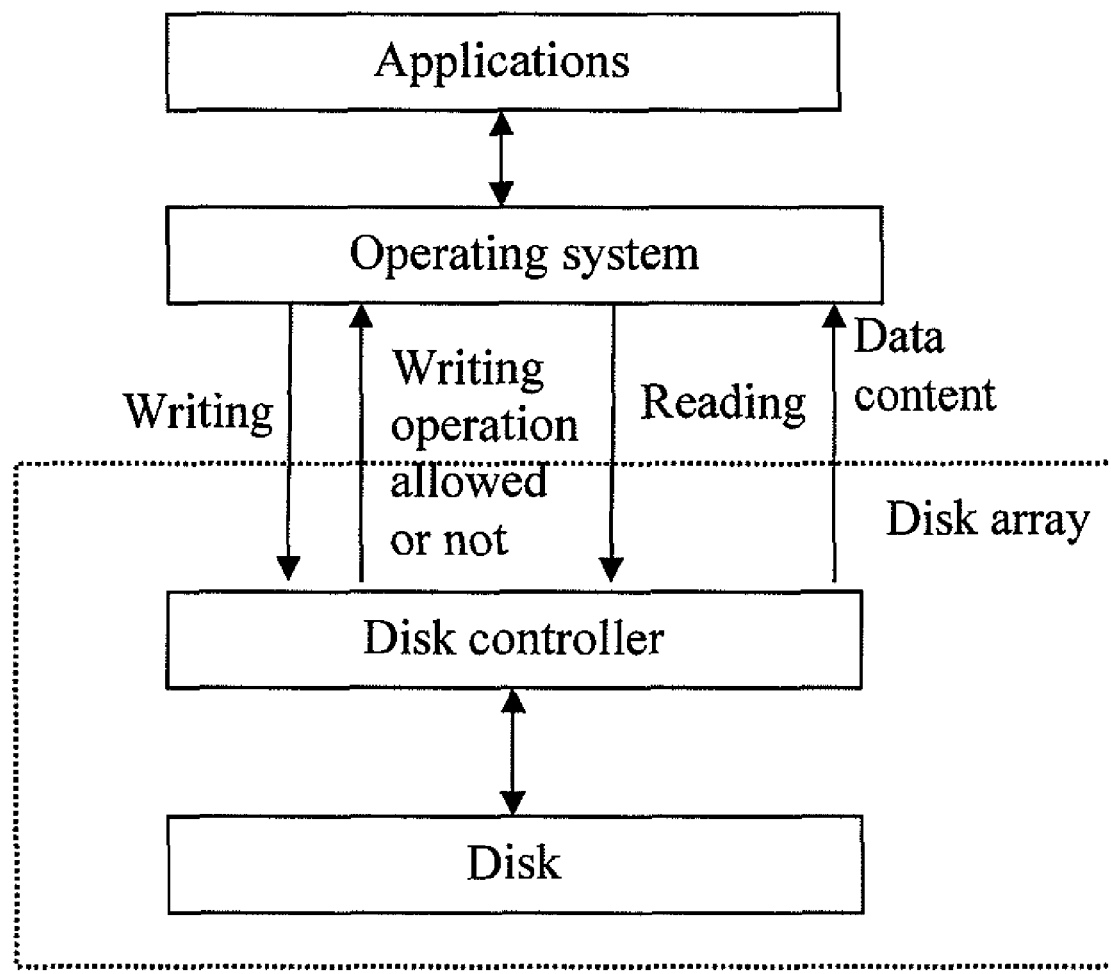
FIG. 1 shows a schematic diagram of implementing the embodiments of the present disclosure.

As shown in FIG. 1, the data generated by the data generator through application software may be written into a disk array through an operating system. The data user may read the data in the disk array through the operating system. The disk array may provide an external interface through the corresponding disk controller. The disk controller with an independent CPU system, a RAM and a bus interface, may be adapted to control the reading and writing operations on the disk. That is to say, all operations on a disk may be performed through a disk controller, and the disk controller isolates the disk from the operating system and the application software. In an embodiment of the present disclosure, the disk controller may control the disk operations, such as write protection, through a control program.

Generally, in a disk array, a sector is used as the minimum recording unit, and the minimum addressing unit of the operating system layer for the disk is also a sector. Therefore, in the foregoing embodiment, the disk area may be a storage area corresponding to one or more sectors in the disk, or the corresponding area in the disk partitioned in other ways. For example, if the minimum addressing unit of the disk is not a sector, the new minimum addressing unit may be used as the corresponding disk area for operation control, where the corresponding disk area may be the minimum operation control area.

In an embodiment of the disclosure, the operation control parameters may include at least one of these items: operation control time parameters and operation control event parameters. The operation control time parameters may include at least one of these parameters: time segment allowed for disk operations, and time segment disallowed for disk operations. The operation control event parameters may include at least one of these parameters: event allowed for disk operations, and triggering event disallowed for disk operations.

To make the essence of the embodiments of the present disclosure clearer, the implementation process of the embodiments of the present disclosure is hereinafter described in detail by reference to accompanying drawings.

Figure 2:
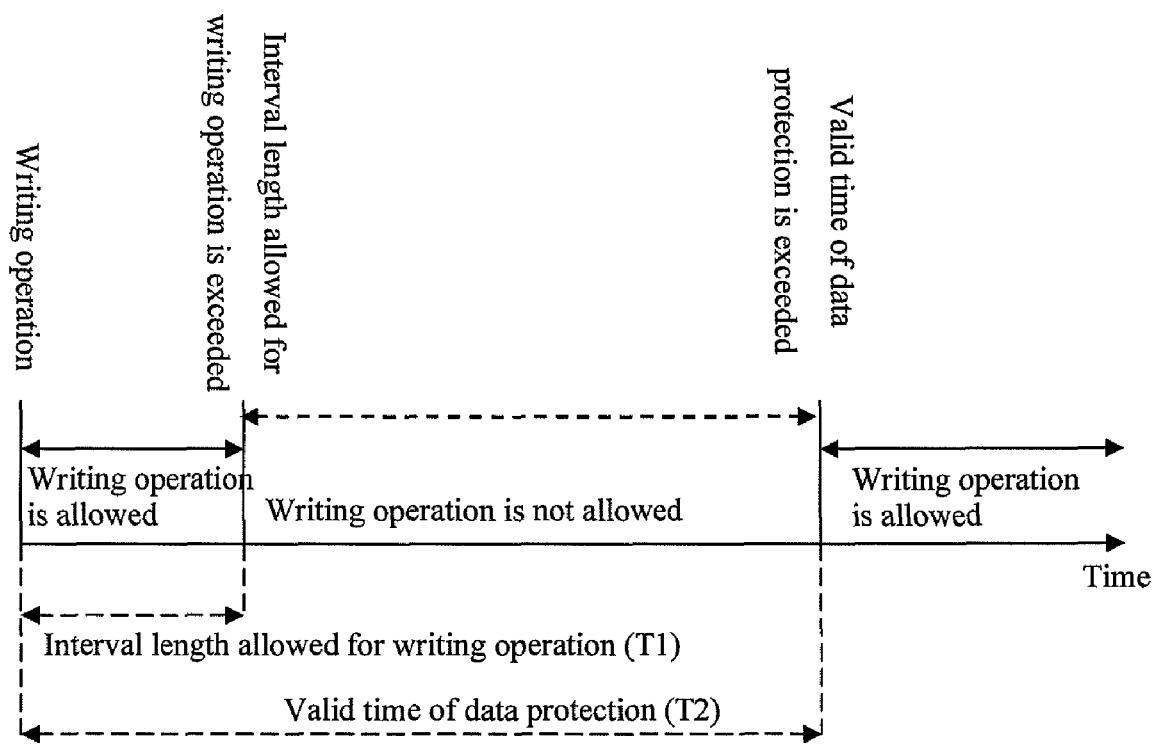
FIG. 2 shows a schematic diagram of setting the operation control parameters in an embodiment of the present disclosure.

Suppose that the disk operation is a writing operation, the disk area that needs to be operated currently is a sector, and the operation control parameters are the operation control time parameters. As shown in FIG. 2, two parameters may be set as the operation control time parameter:

(1) Interval length allowed for writing operation T1, namely, writing operation time window, which is an interval length allowed disk operation. If the difference between the writing operation time and the latest writing operation time, for a sector, does not exceed the interval length allowed for writing operation T1, it is determined that the writing operation to be performed fulfills the requirement of the interval length allowed for writing operation, the writing operation is allowed; otherwise, it is determined that the writing operation does not fulfill the requirement of the interval allowed for writing operations, the writing operation is not allowed.

As a time window, the interval length allowed for writing operations T1 may be set for the whole disk, namely, interval length allowed for writing operations T1 for a disk is set as a writing operation time window of the disk, or set for one or more sectors in the disk, or set for the whole storage system.

The parameter T1 is set to allow for certain application software in which a sector is not written fully at a single attempt, but usually is written at many attempts. The writing operation is regarded as legal if the interval length between the writing operations is not more than T1. That is to say, the user is allowed to write further in a T1 time segment after writing a sector successfully, and the unit of T1 may be minute(s), hour(s), day(s) or month(s). The parameter T1 may be set different value according to different application software.

(2) Valid time of data protection T2, a data protection period of the corresponding disk. If the difference between the writing operation time and the latest writing operation time, for a sector, does not exceed the valid time of data protection, it is determined that the writing operation to be performed fulfills the requirement of the valid time of data protection, the writing operation is not allowed; otherwise, it is determined that the writing operation to be performed does not fulfill the valid time of data protection, the writing operation is allowed.

The valid time of data protection T2 may be set for the whole storage system, or for each disk, or for one or more sectors in a disk.

The valid time of data protection T2 is optional in the practical application software. The setting of T2 may fulfill the requirement of the data owner so that the corresponding data may be retained for a certain time limit (namely, T2) before the write-protection is cancelled. The value of the valid time of data protection T2 is generally greater than 1, and the unit of T2 may be day(s) or month(s).

If a valid time of data protection (T2) is set, the setting may be: T2>T1.

In the specific implementation process, a time index may be created for each sector for recording the latest writing operation time of each sector. Based on the foregoing operation control time parameter, the corresponding disk operation protection mode includes the following steps. A disk controller starts counting time from the latest writing operation of each sector. The writing operations are allowed in the writing operation time window corresponding to the sector. The writing operation time window is the interval allowed for writing operations, and the time label of the sector is updated after completion of the writing operation. After the time exceeds the writing operation time window corresponding to the sector, the sector is write-protected, namely, no writing operation is allowed for the sector. Subsequently, after elapse of a valid time of data protection which starts from the latest writing operation in each sector, namely, after completion of the writing protection period, further writing operations are allowed for the sector.

Supposing that the operated disk area is a sector, a time index may be set for the sector of the disk, and this time index may be adapted to record the interval length between the latest disk operation time and the current time, or to record the latest disk operation time, or to record other information indicative of the latest disk operation time, in order to protect the disk sector based on the interval length between disk operations.

The time index may non-linearly record time index values such as the interval length and the current time to extend the range of recording time, alternatively, the time index may record time index values in other ways.

In the practical application software of the embodiments of the present disclosure, one byte may be used to record the corresponding time index value for each sector. According to this time index value, the latest writing operation time of the sector is calculated out. More particularly, the time index may record the interval length between the current time and the latest writing operation time, or directly record the latest writing operation time as a the latest writing operation time. For example, through comparison between the latest writing operation time and the current time, it is determined whether to allow writing operations for the sector by reference to FIG. 2.

In order to avoid waste of storage space, an embodiment of the present disclosure uses a non-linear time statistic mode with decreasing precision to record the time index value, so that it is available for one byte to record a long storage time. That is to say, a greater interval length between the current time and the latest writing operation time may be recorded, or the latest writing operation time may be recorded through a byte. Alternatively, in the embodiments of the present disclosure, more storage space may be used to record the time index value precisely.

Specifically, the corresponding non-linear time statistic mode may include as follows:

If the interval length between the current time and the latest disk operation time is less than 60 minutes, the minute is used as a unit to measure the interval length or the latest disk operation time.

If the interval length between the current time and the latest disk operation time is greater than 60 minutes but less than 24 hours, the hour is used as a unit to measure the interval or the latest disk operation time.

If the interval length between the current time and the latest disk operation time is greater than 24 hours but less than 1 month, the day is used as a unit to measure the interval length or the latest disk operation time.

If the interval length between the current time and the latest disk operation time is greater than 1 month, the month is used as a unit to measure the interval length or the latest disk operation time.

Figure 3:
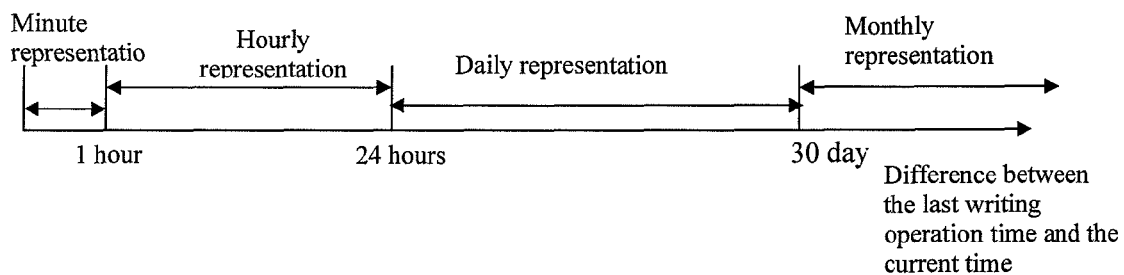
FIG. 3 shows a statistic mode of operation control time parameters in an embodiment of the present disclosure.

As shown in FIG. 3, supposing that the final writing operation time of a sector is YY-MM2-DD HH:MM1, where YY indicates year, MM2 indicates month, DD indicates date, HH indicates hour, and MM1 indicates minute, the corresponding non-linear time statistic mode may record the time index value in the following way, namely, the rules of recording the time index may be as follows:

If the difference between the current time and the latest writing operation time is less than 60 minutes, the time index may be represented by a minute value MM1 of the latest writing operation time, and the corresponding time index value is MM1; or the minute may be used as a unit to measure the difference between the current time and the latest writing operation, where MM1 is the actual interval length measured in minutes.

If the difference between the current time and the latest writing operation time is greater than 60 minutes but less than 24 hours, the time index may be represented by an hour value HH of the latest writing operation time, and the corresponding time index value is HH+60; or the hour may be used as a unit to measure the difference between the current time and the latest writing operation, where HH represents the actual interval length measured in hours.

If the difference between the current time and the latest writing operation time is greater than 24 hours but less than 1 month, the time index may be represented by a date value DD of the latest writing operation time, and the corresponding time index value is DD+83, where 83=60+24−1 (because the date starts from 1); or the day may be used as a unit to measure the difference between the current time and the latest writing operation, where DD represents the actual interval length measured in days.

If the difference between the current time and the latest writing operation time is greater than 1 month, the time index may be represented by difference between the month MM2 of the current time and the month MM2 of the latest writing operation time, and the corresponding time index value is the difference plus 114, where 114=60+24+31−1; or the MM2 value of the latest writing operation may be recorded directly (the maximum value of MM2 is 12). If the former time index recoding mode is applied, the maximum interval length represented is 255−114=141 months, namely, the recorded interval length between the current time and the latest disk operation time may be greater than 11 years, thus increasing the utilization efficiency of the disk space.

Based on the foregoing time index recording rules, if a value recorded by the time index is the latest disk operation time of the current sector, namely, the latest disk operation time before the current time, for example, supposing that the current time is 2007-4-16 11:46, then the latest writing operation time of the current sector corresponding to different time index value may be:

If the time index value of a sector is recorded as 30, it indicates that the sector is measured in minutes, the minute value of the corresponding latest writing operation time is 30, and the latest writing operation time of the sector is 2007-4-16 11:30, with the recorded time index value being as precise as minutes.

If the time index value of a sector is recorded as 62, it indicates that the sector is measured in hours, the hour value of the corresponding latest writing operation time is 2, and the latest writing operation time of the sector is 2007-4-16 2:00, with the recorded time index value being as precise as hours.

If the time index value of a sector is recorded as 85, it indicates that the sector is measured in days, the date value of the corresponding latest writing operation time is 2, and the latest writing operation time of the sector is 2007-04-02 0:00, with the recorded time index value being as precise as days.

If the time index value of a sector is recorded as 116, it indicates that the sector is measured in months, the difference between the month of the latest writing operation time and the current month is 2, and the latest writing operation time of the sector is 2007-2-0 0:00, with the recorded time index value being as precise as months.

Figure 4:
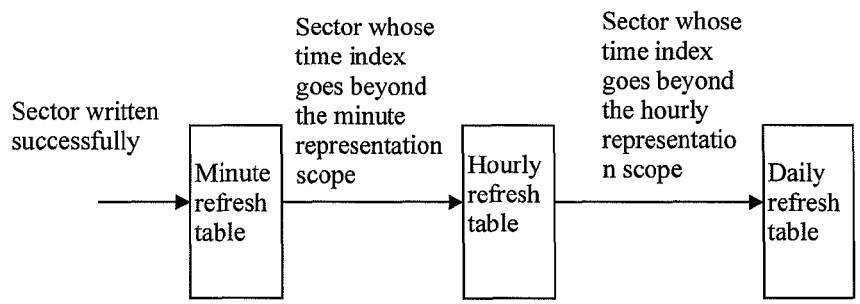
FIG. 4 shows a mode of refresh table in an embodiment of the present disclosure.

When the time index is recorded according to the foregoing recording rules, if the time index cannot be represented in a small unit, it needs to be represented in a greater unit. For example, when the minute counting exceeds 60 minutes, the counting unit is changed to hours. Therefore, a timer may be started on the disk controller to refresh the time index periodically. Furthermore, by reference to FIG. 4, the corresponding time index value may be updated in the following way:

(1) The disk controller may adopt a minute refresh mechanism, namely, the time index value corresponding to the sector is refreshed every minute. After 60 minutes, an hourly refresh mechanism is applied for the sector instead.

More particularly, the time index corresponding to each sector in the minute refresh table is queried every minute. The time index is adapted to record the latest writing operation time. If the minute value of the current time is consistent with the time index value, the hourly refresh mechanism is applied instead to update the corresponding time index, and the serial number of the sector corresponding to the time index is recorded into the hourly refresh table. For example, if the latest writing operation time is 2007-4-11 16:27, in the process where update is performed every minute, all the sectors with the time index value 27 in the minute refresh table need to be modified as corresponding to the time index value 76, namely, 60+16, and updated into the hourly refresh table.

(2) The disk controller may adopt an hourly refresh mechanism, namely, the time index value corresponding to the sector is refreshed hourly. After expiry of 24 hours, a daily refresh mechanism is applied for the sector instead.

More particularly, the time index corresponding to each sector in the hourly refresh table is queried hourly. The time index is adapted to record the latest writing operation time. If the hour value of the current time plus 60 is consistent with the time index value corresponding to the sector, the daily refresh mechanism is applied instead to update the corresponding time index, and the serial number of the sector corresponding to the time index is recorded into the daily refresh table. For example, if the latest writing operation time is 2007-4-11 16:00, all the sectors with the time index value 76 in the hourly update need to be modified as corresponding to the time index value 94, namely, 83+11,and updated into the daily refresh table.

(3) The disk controller may adopt a daily refresh mechanism, namely, the time index value corresponding to the sector is refreshed daily. After expiry of 1 month, a monthly refresh mechanism is applied for the sector instead.

More particularly, the time index corresponding to each sector in the daily refresh table is queried daily. This time index is adapted to record the latest writing operation time. If the date value of the current time plus 83 is consistent with the time index value corresponding to the sector, the time index corresponding to the sector is modified to be represented by months instead, namely, the time index is updated through a monthly refresh mechanism, and its time index value is 115, which represents one month.

It should be known that the number of days of a month varies between months. It is necessary to perform the corresponding update for the days which do not exist in the current month but exist in the latest month, so that the months with less than 31 days may be refreshed normally. For example, in the daily refresh of April 30, the sector with the time index value 113 may be modified as corresponding to the time index value 115, and the sector with the time index value 114 also may be modified to as corresponding to the time index value 115.

(4) The disk controller may adopt a monthly refresh mechanism, namely, the time index value corresponding to the sector is refreshed monthly, and the time index value corresponding to the sector is added.

More particularly, the time index corresponding to all sectors is queried monthly. This time index is adapted to record the interval length between the current time and the latest writing operation time. If the corresponding time index is recorded monthly, the count value corresponding to the time index increases by 1 and is written back to the time index value corresponding to the sector in order to update the time index for the sector In the foregoing processing process, the minute refresh table, hourly refresh table and daily refresh table store the serial number of the sector to be refreshed and the corresponding time index value. By using a serial number of the sector, the corresponding sector can be located directly to perform reading and writing operation. By setting each refresh table, the quantity of sectors that need to be read is reduced in the case of periodical update, and the CPU resources occupied in the periodical update process are reduced.

It should be noted that a corresponding month refresh table may be created to save refresh time, if the sectors based on monthly counting occupy a low proportion of all sectors.

In an embodiment of the present disclosure, after power-off resetting, the refresh tables may be recovered in this way: querying time indexes corresponding to all sectors; recording the time indexes represented by minutes into the minute refresh table; recording the time indexes represented by hours into the hourly refresh table, and recording the time indexes represented days into the daily refresh table.

Based on the foregoing time indexes recording rules, when the operating system performs writing operations for a sector, the time index of the sector is read first, and a judgment is made about whether the sector is in the time range that allows no writing according to the corresponding time index. If the sector is in the time range that allows no writing, the writing operation is forbidden in order to protect the files in the disk.

The process of saving writing operations for a disk in an embodiment of the present disclosure is described below by reference to flowcharts.

Implementation Process 1

Figure 5:
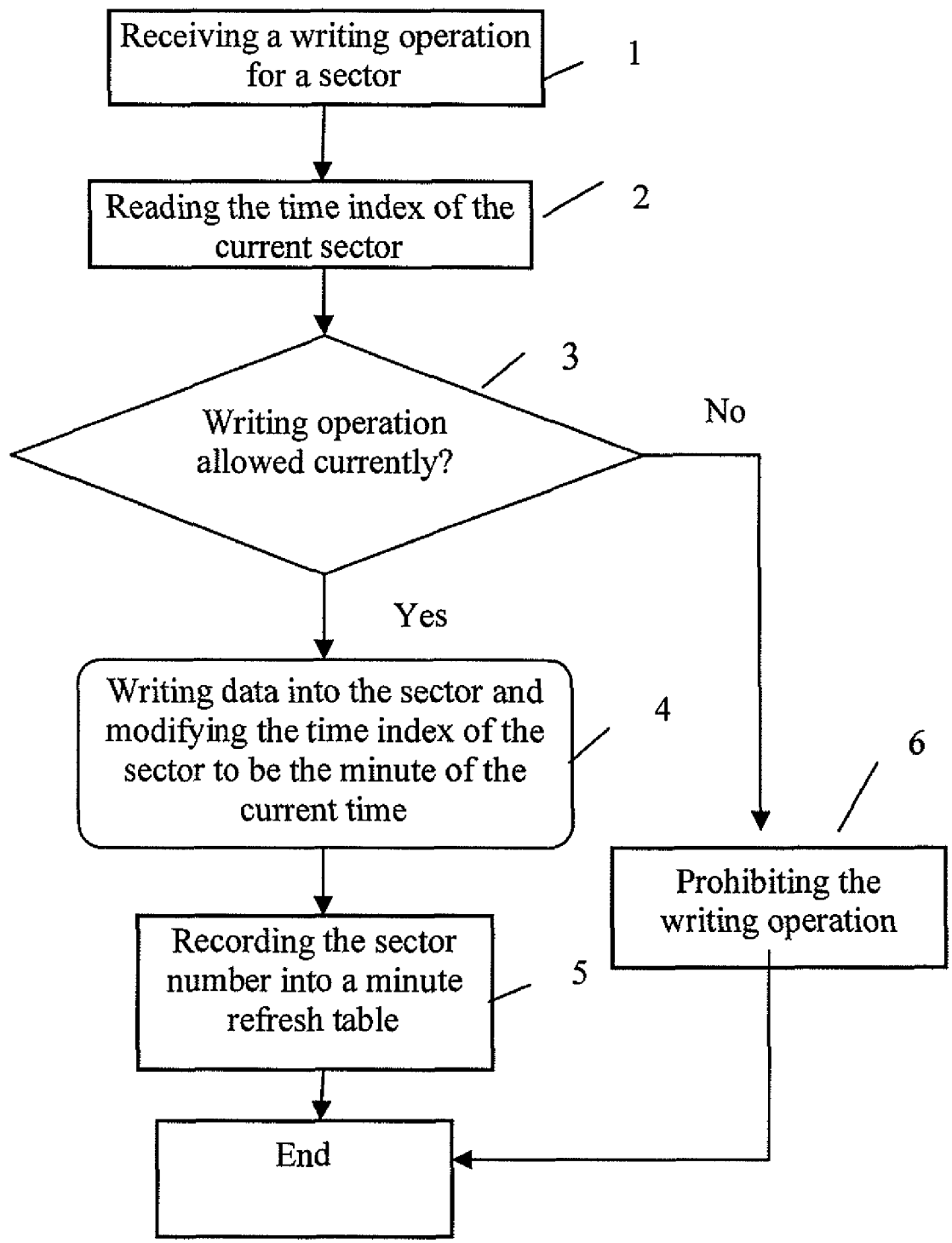
FIG. 5 shows a first schematic diagram of a processing process provided in an embodiment of the present disclosure.

As shown in FIG. 5, the process of performing the writing operation for a disk may include:

Block 1: A disk controller receives a writing operation for a sector in the disk.

Block 2: The disk controller reads the time index value of the sector in order to determine the latest disk operation time according to the time index and further determine the legality of the writing operation.

Block 3: A judgment is made about whether the writing operation is allowed according to the time index value. If the writing operation is allowed, the process proceeds with block 4; if the writing operation is not allowed, the process proceeds with block 6.

The applicable judgment modes may include: a judgment is made about whether the difference between the latest disk operation time and the current time exceeds the preset allowed disk operation interval length according to the time index value. If the preset allowed disk operation interval length is not exceeded, the writing operation is allowed; if the preset allowed disk operation interval length is exceeded, the writing operation is not allowed.

Block 4: The corresponding writing operation is performed. That is, data is written into the corresponding sector in the disk. The corresponding time index value of the sector is modified, namely, the minute of the current time is used as the modified time index value of the sector. The process proceeds with block 5.

Block 5: The serial number of the sector corresponding to the written sector is written into a minute refresh table. The writing operation process is finished.

Block 6: The writing operation is prohibited, and the writing operation process is finished.

It should be noted that the disk operation in the embodiment is namely the writing operation in the embodiment.

Implementation Process 2

Figure 6:
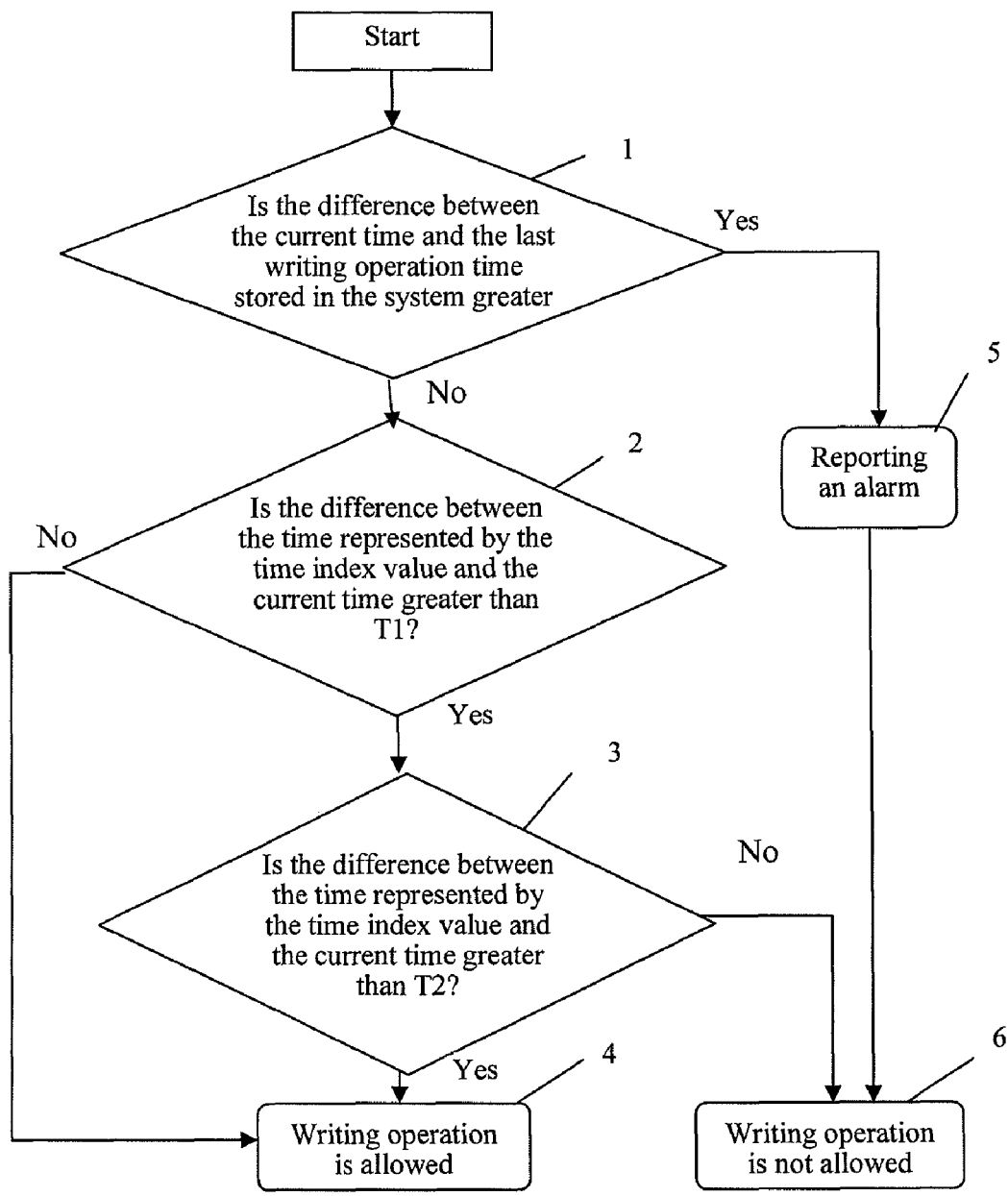
FIG. 6 shows a second schematic diagram of a processing process provided in an embodiment of the present disclosure.

As shown in FIG. 6, a process of determining whether the current cell allows a writing operation according to a time index may include the following blocks:

Block 1: When a writing operation on the disk is required, a judgment is made about whether the difference between the current time and the latest writing operation time stored in the system is greater than a preset value (for example, 5 minutes or other preset time). If greater, it is deemed that the system time is modified illegally, and the process proceeds with block 5; otherwise, the process proceeds with block 2.

Block 2: The difference between the current time and the latest disk operation time (namely, interval length) is determined according to the time index corresponding to the sector currently to be written. A judgment is made about whether the interval length is greater than the preset allowed disk operation interval T1. If greater, the process proceeds with block 3; otherwise, the process proceeds with block 4.

In this block, if the time index value records the difference between the current time and latest disk operation time, the corresponding interval length may be determined directly. If the time index value records the latest disk operation time, the corresponding interval length is determined according to the latest disk operation time recorded by the time index value and the current time. For example, if the time index value is 62, the latest disk operation time is 2:00; if the current time is 6:00, the corresponding interval length is 4 hours.

Block 3: A judgment is made about whether the interval length is greater than the valid time (T2) of data protection. If greater, the process proceeds with block 4; otherwise, the process proceeds with block 6.

Block 4: The writing operation is allowed. The writing operation is performed on the corresponding sector in the disk, and information is written into the corresponding sector.

Block 5: Alarm information is reported and the process proceeds with block 6.

Block 6: The writing operation is not allowed.

It is thus evident that in the processing process shown in FIG. 6, the disk controller adds the operation of block 1 in order to prevent the system time and even the files in the disk from being modified illegally. The detailed operation of block 1 is: The storage system updates the time of each reading operation and writing operation into a non-volatile memory, thus storing the latest modification time of modifying the disk of the storage system. Afterward, when the storage system determines that the difference between the current time and the stored latest modification time is greater than the preset time value (for example, 5 minutes), it is deemed that the time of the storage system is modified illegally. In this case, the corresponding alarm information may be reported, and the corresponding disk operation may be prohibited.

Figure 7:
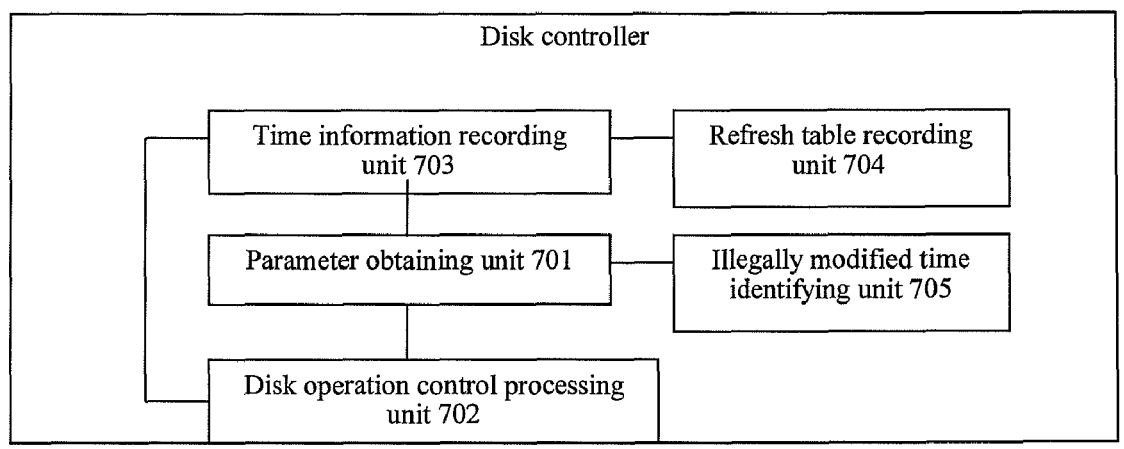
FIG. 7 shows a structure of a disk controller provided in an embodiment of the present disclosure.

As shown in FIG. 7, a disk controller provided in an embodiment of the present disclosure may include a parameter obtaining unit 701 adapted to obtain an operation control parameter corresponding to the current disk area to be operated before performing disk operations, where the operation control parameters are adapted to indicate whether the current disk area is allowed to be operated, for example, whether the sector currently to be operated is allowed to be written. The operation control parameters may include at least one of these items: operation control time parameter, and operation control event parameter. The disk controller may further include a disk operation control processing unit 702 adapted to perform the disk operation if determining that the current disk area is allowed to be operated according to the operation control parameter obtained by the parameter obtaining unit 701.

Depending on the operation control parameter applied, the disk operation control processing unit 702 controls disk operations in any of the following processing modes, without being limited to the processing modes:

Processing Mode 1

If the operation control time parameter includes an interval length allowing disk operations, the disk operation control processing unit may be further adapted to determine whether the interval length between the current time and the latest disk operation time fulfills the allowed disk operation interval length. If the allowed disk operation interval length is fulfilled, the disk operation is allowed; otherwise, the disk operation is prohibited.

Processing Mode 2

If the operation control time parameter includes an interval length allowing disk operations and a valid time of data protection, the disk operation control processing unit 702 may be adapted to determine whether an interval length between the current time and the latest disk operation time fulfills a requirement of the allowed disk operation interval length. If the interval length fulfills the requirement of the allowed disk operation interval length, namely, the interval length does not exceed the allowed disk operation interval length, the disk operation is allowed; if the interval length does not fulfill the requirement of the allowed disk operation interval length, namely, the interval length exceeds the allowed disk operation interval length, the disk operation control processing unit 702 may further be adapted to determine whether the interval length between the current time and the latest disk operation time fulfills a requirement of the valid time of data protection. If the interval length fulfills the requirement of the valid time of data protection, namely, the interval length does not exceed the valid time of data protection, the disk operation is not allowed; prohibit if the interval length does not fulfill the requirement of the valid time of data protection, namely, the interval length exceeds the valid time of data protection, the disk operation is allowed.

Optionally, the disk controller may further include a time information recording unit 703, which is adapted to record the latest disk operation time or the interval length between the current time and the latest disk operation time through a time index, where a non-linear time statistic mode with decreasing precision may be used to record the interval length between the current time and the latest disk operation time. The time information recording unit 703 may record time information in any of the following ways:

Recording Mode 1

If the interval length between the current time and the latest disk operation time is less than 60 minutes, the minute is used as a unit to measure the interval length or the latest disk operation time. If the interval length between the current time and the latest disk operation time is greater than 60 minutes but less than 24 hours, the hour is used as a unit to measure the interval length or the latest disk operation time. If the interval length between the current time and the latest disk operation time is greater than 24 hours but less than 1 month, the day is used as a unit to measure the interval length or the latest disk operation time. If the interval length between the current time and the latest disk operation time is greater than 1 month, the month is used as a unit to measure the interval length or the latest disk operation time.

Recording Mode 2

If the interval length between the current time and the latest disk operation time is less than 60 minutes, the minute is used as a unit to record the minute value of the interval length or the latest disk operation time, and the value range is 0-60. If the interval length between the current time and the latest disk operation time is greater than 60 minutes but less than 24 hours, the HH+60 is used to record the interval length or the latest disk operation time, where HH indicates the hour value of the actual interval length or the latest disk operation time and is measured in hours, and the value range is 0-24. If the interval length between the current time and the latest disk operation time is greater than 24 hours but less than 1 month, the DD+83 is used to record the interval length or the latest disk operation time, where DD indicates the date value of the actual interval length or the latest disk operation time and is measured in days, and the value range is 0-31. If the interval length between the current time and the latest disk operation time is greater than 1 month, the MM+114 is used to record the interval length or the latest disk operation time, where MM indicates the month value of the actual interval length or the latest disk operation time and is measured in months, and the value range is 0-141.

Based on the foregoing time information recording mode, the disk controller may further include a refresh table recording unit 704, which is adapted to record information of the sectors whose time index statistic unit is minutes, hours, days, months respectively by using at least one of these tables: minute refresh table, hourly refresh table, daily refresh table, and monthly refresh table; and record the time index value corresponding to the sector.

Optionally, the disk controller may further include an illegal time modification identifying unit 705, which is adapted to identify whether the interval length between the current system time and the latest disk operation time of the storage system is greater than a preset time value. If greater, prohibit the disk operation for the storage system; otherwise, notify the parameter obtaining unit 701 to perform the corresponding operation.

In the final analysis, a simple disk write-protection method which is not based on application software and operating systems is disclosed herein to protect the data stored in a disk effectively. For example, the method fulfills the requirement of the Sarbanes-Oxley about prohibition of rewriting a file in a specific time period. The solution provided in an embodiment of the present disclosure is characterized by ease of implementation, physical security and reliability, effective protection against illegal modification and flexible control modes.

Although the disclosure has been described through some preferred embodiments, the disclosure is not limited to such embodiments. It is apparent that those skilled in the art can make various modifications and substitutions to the disclosure without departing from the spirit and scope of the disclosure. The disclosure is intended to cover the modifications and substitutions provided that they fall in the scope of protection defined by the following claims or their equivalents. The disclosure is intended to cover the modifications and substitutions provided that they fall in the scope of protection defined by the claims or their equivalents.

What is claimed is:

1. A method for disk operation protection, comprising:
   obtaining, by a disk controller, an operation control parameter corresponding to a current disk area to be operated upon receiving a request for a disk operation;
   determining whether the current disk area is allowed to be operated according to the operation control parameter; and
   performing the disk operation if it is determined that the current disk area is allowed to be operated according to the operation control parameter,
   wherein the operation control parameter comprises at least one of an operation control time parameter and an operation control event parameter.

2. The method of claim 1, wherein the operation control time parameter comprises an interval length allowed for disk operation, and the determining whether the current disk area is allowed to be operated according to the operation control parameter comprises:
   determining whether an interval between a current time and a latest disk operation time fulfills a requirement of the interval length allowed for disk operation;
   performing the disk operation if the interval fulfills the requirement; and
   prohibiting the disk operation if the interval does not fulfill the requirement.

3. The method of claim 1, wherein the operation control time parameter comprises an interval length allowed for disk operation and a valid time of data protection, and the determining whether the current disk area is allowed to be operated according to the operation control parameter comprises:
   determining whether an interval between a current time and a latest disk operation time fulfills a requirement of the interval length allowed for the disk operation;
   performing the disk operation if the interval fulfills the requirement of the interval length allowed for the disk operation;
   further determining whether the interval between the current time and the latest disk operation time fulfills a requirement of the valid time of data protection if the interval does not fulfill the requirement of the interval length allowed for the disk operation;
   performing the disk operation if the interval does not fulfill the requirement of the valid time of data protection; and
   prohibiting the disk operation if the interval fulfills the requirement of the valid time of data protection.

4. The method of claim 1, further comprising:
   recording a latest disk operation time or an interval between a current time and the latest disk operation time, by a time index in a nonlinear time statistic mode with decreasing precision.

5. The method of claim 4, wherein the nonlinear time statistic mode comprises:
   measuring the latest disk operation time or the interval between the current time and the latest disk operation time in minute(s) if the interval is less than 60 minutes;
   measuring the latest disk operation time or the interval between the current time and the latest disk operation time in hour(s) if the interval is greater than 60 minutes but less than 24 hours;
   measuring the latest disk operation time or the interval between the current time and the latest disk operation time in day(s) if the interval is greater than 24 hours but less than 1 month; and
   measuring the latest disk operation time or the interval between the current time and the latest disk operation time in month(s) if the interval is greater than 1 month.

6. The method of claim 5, further comprising:
   recording information of a plurality of sectors with time index statistic units corresponding to minutes, hours, days and months, respectively, and recording time index values corresponding to the plurality of sectors,
   wherein the information of the plurality of sectors with time index statistic units corresponding to minute, hour, day and month is recorded respectively by a minute refresh table, a hourly refresh table, a daily refresh table and a monthly refresh table.

7. The method of claim 1, further comprising:
   determining whether an interval between a current system time and a latest disk operation time of a storage system is greater than a preset value;
   prohibiting the disk operation if the interval between the current system time and the latest disk operation time of the storage system is greater than the preset value; and
   performing the step of obtaining the operation control parameter corresponding to the current disk area to be operated if the interval between the current system time and the latest disk operation time of the storage system is not greater than the preset value.

8. A disk controller, comprising:
   a parameter obtaining unit, adapted to obtain an operation control parameter corresponding to a current disk area to be operated upon receiving a request for a disk operation, wherein the operation control parameter is used to indicate whether the current disk area is allowed to be operated; and
   a disk operation control processing unit, adapted to determine whether the current disk area is allowed to be operated according to the operation control parameter obtained by the parameter obtaining unit, and perform the disk operation if it is determined that the current disk area is allowed to be operated,
   wherein the operation control parameter comprises at least one of an operation control time parameter and an operation control event parameter, and the operation control time parameter comprises an interval length allowed for the disk operation.

9. The disk controller of claim 8,
the disk operation control processing unit is further adapted to determine whether an interval between a current time and a latest disk operation time fulfills a requirement of the interval length allowed for the disk operation, perform the disk operation if the interval fulfills the requirement, and prohibit the disk operation if the interval does not fulfill the requirement.

10. The disk controller claim 8, wherein the disk operation control processing unit is further adapted to:
determine whether an interval between a current time and a latest disk operation time fulfills a requirement of the interval length allowed for the disk operation,
perform the disk operation if the interval fulfills the requirement of the interval length allowed for the disk operation,
further determine whether the interval between the current time and the latest disk operation time fulfills a requirement of the valid time of data protection if the interval does not fulfill the requirement of the interval length allowed for the disk operation,
perform the disk operation if the interval does not fulfill the requirement of the valid time of data protection, and
prohibit the disk operation if the interval fulfills the requirement of the valid time of data protection.

11. The disk controller claim 8, further comprising:
a time information recording unit, adapted to record a latest disk operation time or an interval between the current time and the latest disk operation time by a time index in a nonlinear time statistic mode with decreasing precision.

12. The disk controller claim 11, further comprising:
a refresh table recording unit, adapted to record respectively information of a plurality of sectors with time index statistic units corresponding to minutes, hours, days and months, wherein and record time index values corresponding to the plurality of sectors,
wherein the information of the plurality of sectors with time index statistic units corresponding to minutes, hours, days and months is recorded respectively by a minute refresh table, a hourly refresh table, a daily refresh table and a monthly refresh table.

13. The disk controller claim 8, further comprising:
an illegal time modification determining unit, adapted to determine whether an interval between a current system time and a latest disk operation time of the storage system is greater than a preset value, prohibit the disk operation if the interval is greater than the preset value, and enable the parameter obtaining unit to obtain an operation control parameter if the interval is not greater than the preset value.

\* \* \* \* \*